No. 802,281. PATENTED OCT. 17, 1905.
W. H. GEERKEN & T. CAILLOUET.
GRAPPLE.
APPLICATION FILED SEPT. 10, 1904.

2 SHEETS—SHEET 1.

Witnesses
Edwin G. McKee
K. Allen.

Inventors
William H. Geerken
Theophile Caillouet
By Victor J. Evans
Attorney

No. 802,281. PATENTED OCT. 17, 1905.
W. H. GEERKEN & T. CAILLOUET.
GRAPPLE.
APPLICATION FILED SEPT. 10, 1904.
2 SHEETS—SHEET 2.
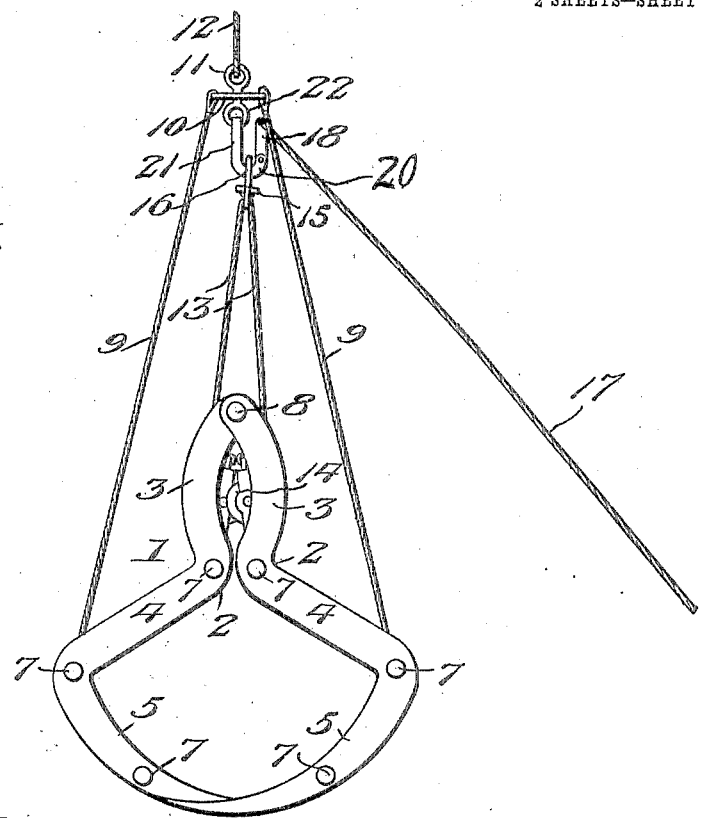
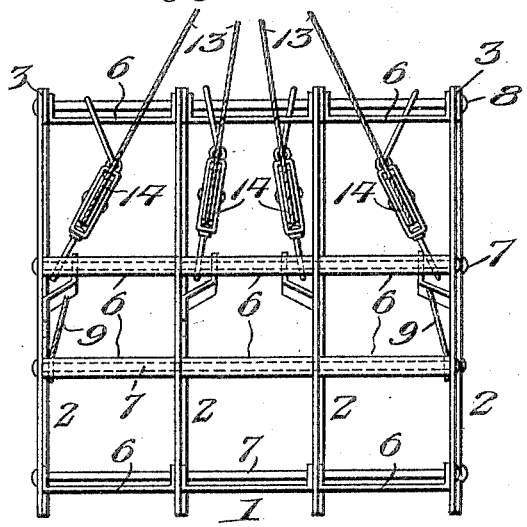
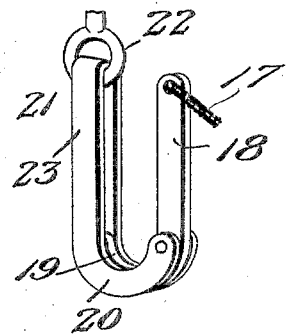
Inventors
William H. Geerken
Theophile Caillouet
By Victor J. Evans
Attorney
Witnesses
Edwin G. McKee
K. Allen.

UNITED STATES PATENT OFFICE.

WILLIAM H. GEERKEN AND THEOPHILE CAILLOUET, OF FRANKLIN, LOUISIANA.

GRAPPLE.

No. 802,281.  Specification of Letters Patent.  Patented Oct. 17, 1905.

Application filed September 10, 1904. Serial No. 224,008.

*To all whom it may concern:*

Be it known that we, WILLIAM H. GEERKEN and THEOPHILE CAILLOUET, citizens of the United States, residing at Franklin, in the parish of St. Mary and State of Louisiana, have invented new and useful Improvements in Grapples, of which the following is a specification.

This invention relates to forks or grapples for handling cane, grain, and other substances; and its object is to provide means for more efficiently controlling the action of the grapple to engage and release the load.

The invention consists of the features of construction, combination, and arrangement of parts hereinafter fully described and claimed, reference being had to the accompanying drawings, in which—

Figure 1:
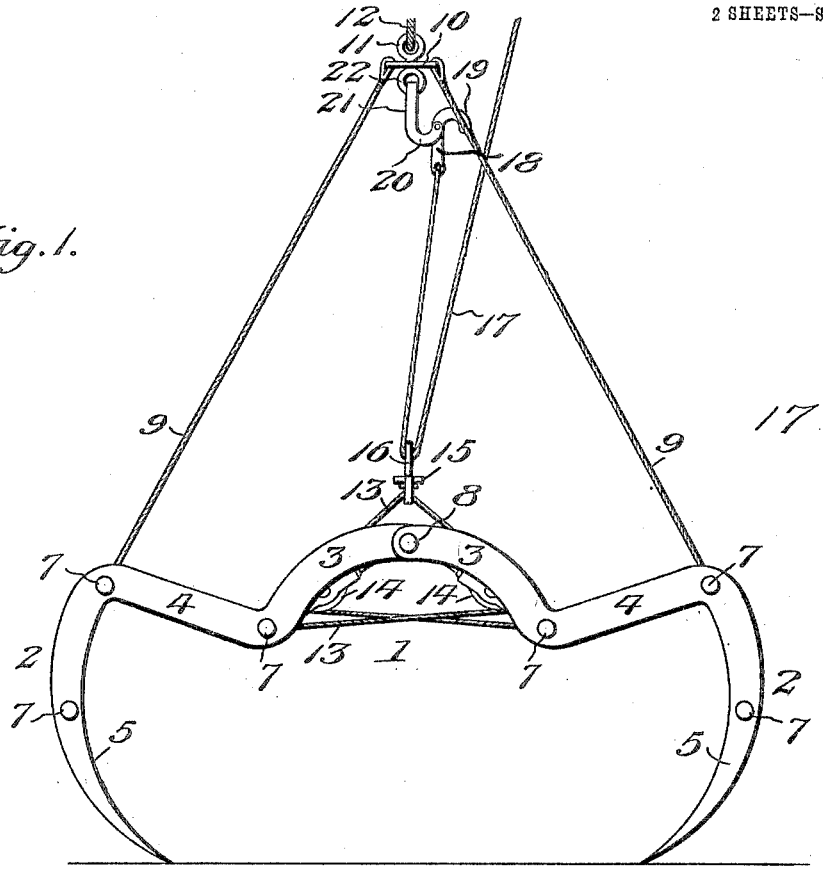
Figure 2:
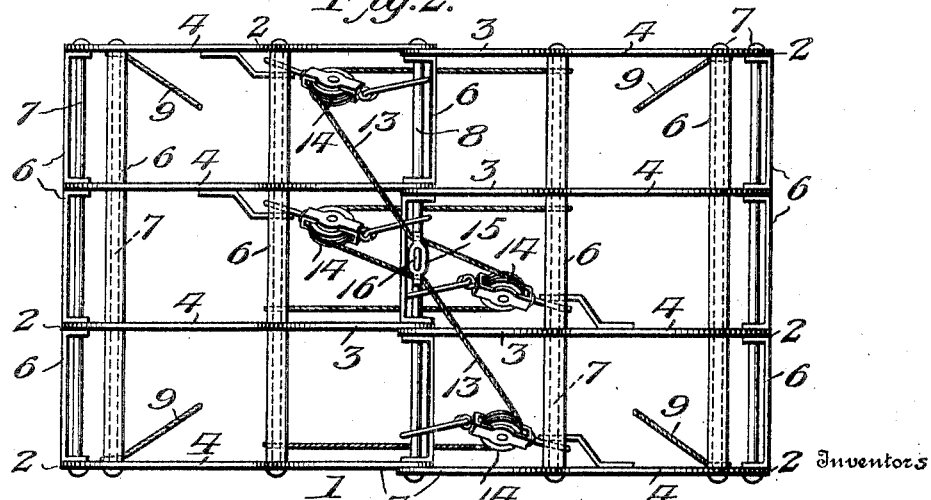

Figure 1 is an end elevation of a grapple embodying our invention, showing the forks in their open or released position. Fig. 2 is a top plan view of the same. Fig. 3 is a view similar to Fig. 1, showing the forks of the grapple closed. Fig. 4 is a side elevation of the grapple, and Fig. 5 is a perspective view of the controlling and releasing device.

Referring now more particularly to the drawings, the numeral 1 designates the grapple, which consists of two sets or series of forks 2, arranged side by side and each comprising in its construction a head 3, an arm 4, extending at an angle outwardly therefrom, and an inwardly-curved tine or finger 5, the said forks being arranged in opposite pairs, so as to open and close to release and engage the material to be loaded or transported. The fork members composing each side of the grapple are spaced and connected at intervals by transverse braces 6 and bracing-rods 7, which are suitably secured thereto to form a staunch and rigid structure. The two sets or series of forks composing the two sides of the grapple are connected to each other by a rod or shaft 8, upon which the heads 3 of the forks are pivotally mounted, so as to adapt the grapple to open and close.

The grapple is supported in use by ropes, chains, or cables 9, of which four are shown, the same extending from the corners of the two sides of the grapple to a collar or spreader-plate 10, mounted upon a suspending-link 11. To the eye 11 at the upper end of the link is attached a chain, rope, or cord 12, which may lead to an operating frame or derrick or hang from some suitable support. The chains, ropes, or cables 9 may be attached at their lower ends directly to the fork members, but are preferably connected, as shown, to the transverse rods 7, connecting the fork members at the points of junction of their arms 4 with their tines or fingers 5. Connected to the rods 7, passing through the forks at the angle formed at the points of junction of the heads 3 with the arms 4, are controlling cords, ropes, or cables 13, which pass reversely through sheaves or pulleys 14, hung between said rod 7 and the shaft or pivot-rod 8 and connected at their upper ends to a collar or spreader-plate 15, carried by an eyebolt or rod 16. A releasing-lever 18 has a hooked-shaped end 19, which is pivoted, as shown at 19', at its inner extremity to the free ends of the hook-shaped portions 20 of a suspending-hook 21, connected to an eye 22 on the lower end of the suspending-link 11, the said lever and suspending-hook forming a controlling and releasing device governing the action of the cords, chains, or cables 13 to effect the opening and closing of the grapples. When the lever 18 is closed, the hook 19 thereof folds between the hooked portions 20 of the suspending hook or member 21, with its bill or free end projecting inwardly toward and between the inner extremities of the said hooked portions 20. As disclosed in the present instance and as shown in Fig. 5, the suspending-hook 21 of the releasing device consists of a metallic strap doubled upon itself to form a loop 23, hanging suspended from the eye 22 and terminating at its free end in the hooked portions 20, to the extremities of which the lever 18 is connected at the point of junction of its operating-arm and hook member. A controlling cord, chain, or cable 17 is attached to the outer end of the releasing-lever 18 to permit said lever to be swung on its pivot to disengage the eye or suspending member 16 from the suspending-hook 21. By reference to Figs. 3 and 5 it will be seen that when the hook 19 of the lever 18 is in closed position or folded between the hooked terminals 20 of the suspending device 21 the suspending-eye 16 will rest upon the said hooked terminals 20, so that the weight of the load will be supported by said suspending device 21. At the same time the suspending-eye 16 will bridge across the two hooks 20 and bear upon or lie in the path of the hook 19, thus causing the weight of the load to hold the lever 18 closed or in locked position without the use of extraneous fastenings and without transmitting any part of the weight of the load to said lever. By this means the use of auxiliary fastenings to hold the releasing device closed is not only obviated, but accidental dumping of the load will be effectually avoided, as the lever cannot be swung open and the load released until a strong pull is exerted upon the releasing-cord 17.

Fig. 1 of the drawings shows the grapple with the forks in their open or released position to engage a load, while Fig. 2 shows the grapple closed, with the forks in position engaging a load to allow it to be swung or moved to the desired point of deposit, and by reference to Fig. 3 it will be seen that when the grapple is closed the link or eye upon the bolt or rod 16 is hung upon the hooked portions 20 of the suspending device 21 and engaged with the hooked portion of the lever 18 and holds the latter folded between the hooks 20, whereby the cords, ropes, or cables 13 are held in an upwardly-drawn position to force the tines 5 of the grapple closed. When the grapple is lowered to engage a load, by pulling or jerking upon the rope 17 as the grapple nears the load the lever 18 will be swung on its pivot and throw the part 16 out of engagement with the hooks 20, thus allowing the forks of the grapple to swing by gravity to their open position (shown in Fig. 1) in readiness to engage the load. When the parts are so positioned, the rope 12 is lowered or slacked up, allowing the suspeniug device to be lowered and the part 16 connected therewith as before, so that when the rope 12 is drawn upon the ropes 9 will be elevated and the ropes 13 drawn upon to swing the tines or fingers to a closed position, thus causing the grapple to engage the load. It will thus be seen that the construction and arrangement of the parts of the releasing device adapts the grapple to be conveniently manipulated and causes the fork in the lifting movement to close and engage the load before rising from the ground, thus preventing any loss or waste of material in lifting the load from the ground; also, that the eyebolt 16, attached to the controlling-cords 13, rests upon the suspending-hooks 20 of the member 21 and lies in the path of the hooked end 19 of the lever 18 when the grapple is closed, whereby the weight of the load will be sustained by the suspending-hooks and relieved from the lever 18, the latter being held in its closed position by the bolt 16 until opened by a pull upon the controlling-cord 17, whereby the lever 18 may be swung upon its pivot to disengage the bolt or suspending member 16 from the suspending-hooks 21. Thus the hook 19 will be relieved from all strain, and as its bill or free end lies between the inner ends or extremities of the suspending-hooks 20 will be protected during the operation of the grapple.

It will of course be understood that the ropes 12 and 17 may be operated manually or by means of suitable power devices, such as winding-drums, and that such changes in the construction and arrangement of parts as may be deemed desirable may be made within the scope of the invention without departing from the spirit or sacrificing any of the advantages thereof.

Having thus described the invention, what is claimed as new is—

1. A grapple, a support, a suspending member connected to the grapple to hold it supported in closed position from said support, said support being adapted to directly sustain the weight of the load, a releasing device carried by said support and engaged by said suspending member and held closed by the pressure thereof under the weight of the load, and means for operating said releasing device, substantially as described.

2. A grapple, a supporting device, a grapple-releasing device, a member connected to the grapple to engage the supporting device and support the grapple in closed position therefrom, said member engaging the releasing device and normally holding it closed, and means for operating the releasing device.

3. A grapple comprising pivotally-connected gravity-opening forks, means for suspending the same, a hooked member connected to the suspending means, fork-closing means adapted to be supported from said hooked member to hold the forks in closed position, a hooked lever coacting with said hooked member to release the fork-closing device, and an operating member connected to said lever, substantially as described.

4. In a grapple, a grapple controlling and releasing device comprising a non-pivoted suspending member to receive and hold a grapple-support and directly sustain the weight of the load, and a releasing device pivoted to fold within said supporting portion of the suspending member and to lie beneath the grapple-support thereon, and be thereby held closed by the weight of the load.

5. In a grapple of the character described, a releasing device comprising a suspending member having spaced supporting-hooks, and a hooked lever pivoted at the inner extremity of its hooked portion to the free ends of said hooks, said hooked portion of the lever being adapted to fold between said spaced hooks with its bill or free end projecting inwardly toward and between the inner extremities of said spaced hooks.

6. In a grapple of the character described, a controlling and releasing device comprising a suspending member composed of a U-shaped body forming a suspending portion and having supporting-hooks at its end, and a hooked lever pivoted at the inner extremity of its hooked portion to the free ends of said hooks of the suspending portion, said hooked portion of the lever being adapted to fold between said hooks of the suspending portion with its bill or free end projecting inwardly toward and between the inner extremities of the suspending-hooks.

7. A grapple, a support, a suspending device adapted to be hung upon said support to hold the grapple in closed position, said support being adapted to directly sustain the weight of the load, and a releasing device for directly throwing the suspending device out of engagement with the support.

8. A grapple, a support, a releasing device, a suspending device adapted to be engaged with the support to hold the grapple closed and to lie in the path of opening movement of the releasing device to hold the same from opening, and means for operating the said releasing device to disengage the suspending device from the support.

9. A grapple, a support having a hooked portion, a suspending device adapted to be hung upon said hooked portion to hold the grapple in closed position, whereby the support is adapted to sustain the weight of the load, and a hooked releasing-lever pivoted to said support and having its hooked portion lying below the suspending device when the latter is engaged with the support and adapted to be actuated to directly throw said suspending device out of engagement with the support to permit the grapple to open.

In testimony whereof we affix our signatures in presence of two witnesses.

WILLIAM H. GEERKEN.
THEOPHILE CAILLOUET.

Witnesses:
EMMET ALPHA,
ISAAC S. WOOSTER.